(12) United States Patent
Riggs (10) Patent No.: US 7,080,713 B1
(45) Date of Patent: Jul. 25, 2006

(54) LADDER ASSEMBLY FOR VEHICLES

(76) Inventor: Robert R. Riggs, P.O. Box 1118, Lake Arrowhead, CA (US) 92352

( * ) Notice: Subject to any disclaimer, the term of this patent is extended or adjusted under 35 U.S.C. 154(b) by 0 days.

(21) Appl. No.: 10/759,736

(22) Filed: Jan. 16, 2004

Related U.S. Application Data (60) Provisional application No. 60/440,556, filed on Jan. 16, 2003.

(51) Int. Cl.
  *E06C 5/00* (2006.01)
  *E06C 9/00* (2006.01)
  *B60R 9/00* (2006.01)
(52) U.S. Cl. .................... 182/127; 182/97; 224/326
(58) Field of Classification Search ................ 182/127, 182/129, 97, 90, 92, 93, 91, 150, 88; 224/310, 224/321, 324, 326, 327; 414/462; 280/163–166
See application file for complete search history.

(56) References Cited

U.S. PATENT DOCUMENTS

| | | | |
|---|---|---|---|
| 2,946,397 A * | 7/1960 | Berberich | .................... 182/127 |
| 3,123,178 A * | 3/1964 | Momaghan et al. | .......... 182/97 |
| 3,545,567 A | 12/1970 | Dohrman | |
| 4,021,071 A | 5/1977 | Norman | |
| 4,161,997 A | 7/1979 | Norman | |
| 4,408,680 A * | 10/1983 | Ross | .......................... 182/127 |
| 4,482,029 A * | 11/1984 | Prochaska | .................... 182/96 |
| 4,639,032 A | 1/1987 | Barbour | |
| 4,757,876 A | 7/1988 | Peacock | |
| 4,846,487 A | 7/1989 | Criley | |
| 4,848,821 A | 7/1989 | Llewellyn | |
| 4,877,108 A * | 10/1989 | Griffin et al. | ................ 182/127 |
| 4,909,352 A * | 3/1990 | McComb | ..................... 182/127 |
| 5,205,603 A | 4/1993 | Burdette, Jr. | |
| 5,366,052 A * | 11/1994 | Keh-Lin | ...................... 182/127 |
| 5,617,930 A | 4/1997 | Elia | |
| 5,687,813 A | 11/1997 | Bensch | |
| 6,003,633 A * | 12/1999 | Rolson | ........................ 182/127 |
| 6,116,378 A | 9/2000 | Barrow | |
| 6,270,139 B1 | 8/2001 | Simpson | |
| 6,315,078 B1 * | 11/2001 | Kumher et al. | .............. 182/127 |
| 6,820,723 B1 * | 11/2004 | Huber | .......................... 182/127 |
| 2002/0189903 A1 | 12/2002 | Krish, Jr. | |

* cited by examiner

*Primary Examiner*—Hugh B. Thompson, II
(74) *Attorney, Agent, or Firm*—Knobbe Martens Olson & Bear, LLP (57) ABSTRACT

A ladder assembly including a mounting system and a ladder that is adapted to be pivotally attached to a vehicle such as the tailgate of a truck bed. When the tailgate is opened, the ladder can be pivoted away from the vehicle bed to a substantially perpendicular position with respect to the tailgate or its original orientation. Following, the lower end of the ladder is adapted to pivot downwardly such that the lower end of the tailgate contacts the ground surface. The ladder is further pivotable about a second pivot member in a lateral manner such that the lower ends of the support legs of the tailgate ladder contact the ground depending on the slope of the ground surface.

22 Claims, 9 Drawing Sheets

LADDER ASSEMBLY FOR VEHICLES

RELATED APPLICATIONS

This application claims the benefit of U.S. Provisional Application No. 60/440,556, filed Jan. 16, 2003, which is hereby incorporated by reference in its entirety.

BACKGROUND OF THE INVENTION

1. Field of the Invention

The present invention generally relates to ladder assemblies, and more particularly to a ladder assembly suited for use with a variety of vehicles, such as pickup trucks, flatbed trucks, sports utility vehicles.

2. Description of the Related Art

Some vehicles with beds, such as trucks, are generally useful for hauling various objects. The vehicle bed is typically some distance from the ground surface. Unfortunately for some people, this can pose safety problems getting in and out of the vehicle bed. For example, jumping out of the vehicle bed can cause injury to feet, ankles, legs, or even falling can cause injury to other parts of the body.

To overcome these safety issues, it has been suggested to use a ladder to get in and out of the vehicle bed. Unfortunately, a typical ladder may often times be unpractical. Many conventional types of ladders are too big and take up too much storage space within the vehicle bed. If a smaller ladder is used, it may be stolen or jostle around in the vehicle bed during travel. In addition, some of these ladders have telescoping or folding legs for ease of storage. However, over time, the telescoping or folding joints that hold the ladder together can weaken and could make the ladder unstable during use. Also, some other types of ladders do not have hand rails or gripping components, and, thus, may induce a person to lose balance and fall off of the ladder resulting in injury. Still other ladders require a flat surface for proper stability. This often requires the user to park the vehicle on a flat surface, which is often inconvenient since many ground surfaces are sloped or on an incline.

As a result, there currently exists a need for an improved ladder assembly that allows a user to get in and out of a vehicle bed in a safe and convenient manner. To this end, there also exists a need to improve the structure of conventional vehicle ladder assemblies to thereby improve the ease of use, stability, and safety for the user.

SUMMARY OF THE INVENTION

In one aspect, the preferred embodiments of the present invention provide a ladder assembly for a cargo vehicle having a cargo space wherein articles can be positioned for transport. The ladder assembly comprises a mounting structure that attaches to an interior surface of the cargo space of the vehicle, a ladder having a pair of side members and a plurality of rungs extending therebetween, and an attachment assembly interconnecting the ladder to the mounting structure. The attachment assembly allows for movement of the ladder from a storage configuration wherein the ladder assembly is secured to the interior surface of the cargo space of the vehicle to a deployed configuration wherein the ladder is rotated out of the plane of the interior surface and pivoted so as to be extended from the interior surface of the cargo space of the vehicle to the ground so as to allow an individual access to the cargo space of the vehicle from the ground by climbing the ladder wherein the attachment assembly includes a pivot member so as to allow the ladder to pivot in the deployed configuration about an axis to thereby allow the side members of the ladder to be positioned in contact with the ground when the ground is not parallel to the interior surface.

In one embodiment, the mounting structure is adapted to be mounted to an inner surface of a tailgate assembly of a pickup truck such that, in the storage configuration, the ladder is secured to the tailgate when the tailgate is in a closed position. In another embodiment, the mounting structure secures the ladder to the tailgate such that the ladder is suspended from the tailgate to thereby remove the ladder from the floor of the bed of the pickup truck to increase the amount of available space within the bed of the pickup for cargo. In yet another embodiment, the securing structure comprises a pair of parallel mounting members that mount to the tailgate and define a recess between the tailgate and the mounting member such that a portion of the ladder can be positioned within the recess so as to suspend the ladder from the mounting members. In yet another embodiment, the attachment assembly further includes a first pivot structure that has a pivot axis perpendicular to the interior surface of the cargo space so as to allow the ladder to rotate in the plane of the interior surface of the cargo space so as to be positioned outward of the interior space.

Preferably, the mounting structure engages with the ladder when the ladder is positioned outward of the interior surface so as to limit the rotational movement of the ladder about the first pivot axis. In one embodiment, the attachment assembly further includes a second pivot structure that allows the ladder to pivot so as to allow the ladder to extend from the interior surface of the cargo space to the ground. In another embodiment, the attachment assembly includes a third pivot structure that allows the ladder to pivot about a third axis when extending from the interior surface of the ground. Preferably, the side members of the ladder assembly are coupled to the attachment assembly in a manner that allows the ladder to be extended outward from the interior surface in the deployed configuration. In one embodiment, the attachment assembly further includes a securing member that couples the side members of the ladder to the attachment assembly and a plurality of mounting locations that engage the securing member so as to allow the securing member to be attached to the mounting locations in one of a plurality of different mounting orientations. In another embodiment, the securing member attached to the attachment assemblies and the mounting locations comprise a plurality of holes formed in the side members of the ladder such that the ladder can be detachably engaged to the attachment assembly in one of a plurality of different locations and wherein the securing member defines a pivot point for the ladder with respect to the attachment assembly.

In another aspect, the preferred embodiments of the present invention provide a ladder assembly for a pickup truck having a tailgate. The ladder assembly comprises a mounting structure attached to the interior surface of the tailgate of the pickup truck, a ladder having two side members and a plurality of rungs extending therebetween, an attachment assembly interconnecting the ladder to the mounting structure, wherein the mounting structure retains the ladder in a storage configuration against the tailgate when the tailgate is in the closed position such that the side members of the ladder extend parallel to the length of the tailgate in the storage configuration and wherein the attachment assembly permits the ladder to be rotated out of the plane of the tailgate and then pivoted downward to the ground in a deployed configuration.

DETAILED DESCRIPTION OF THE PREFERRED EMBODIMENT

Figure 1:
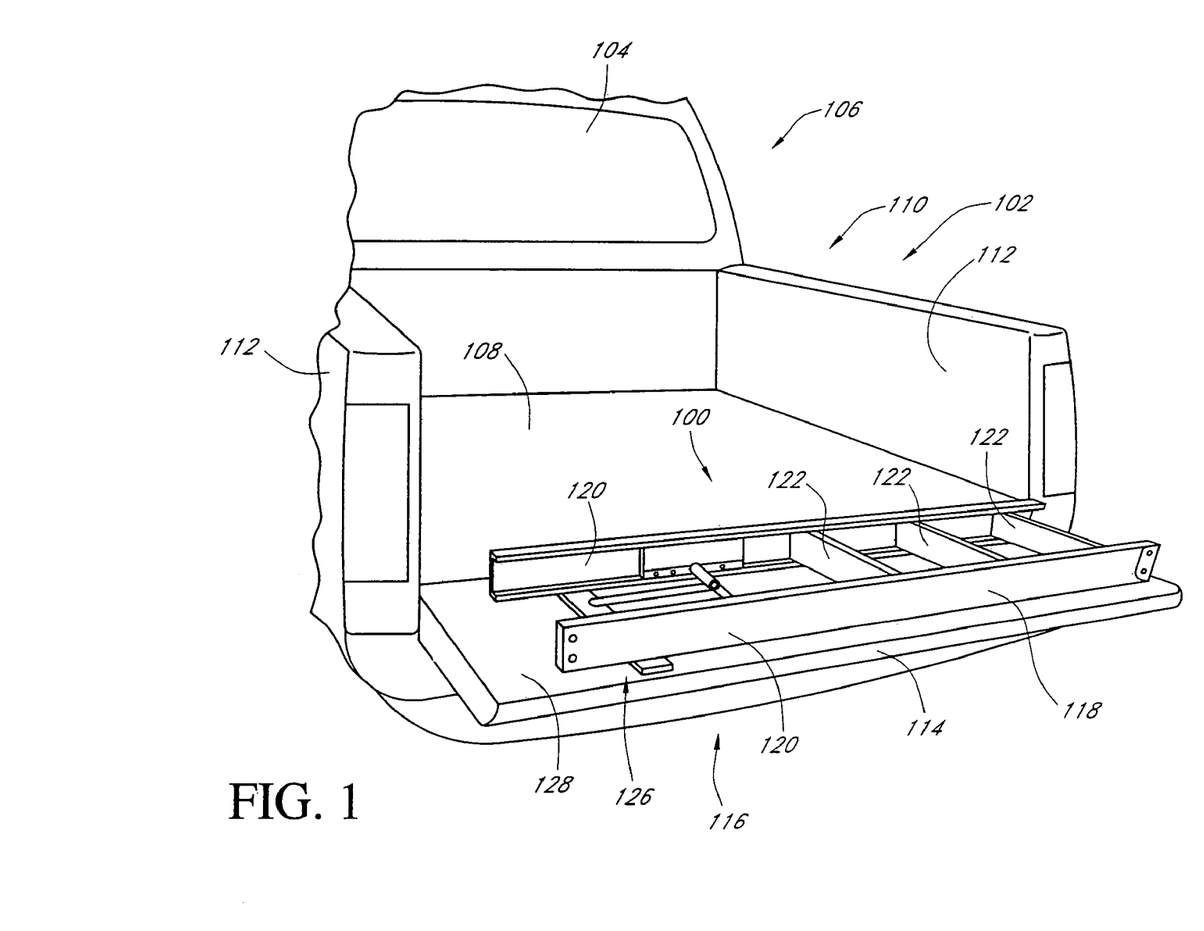
FIG. 1 schematically illustrates a ladder assembly of one embodiment of the present invention, showing the ladder assembly attached to the tailgate of a vehicle.

Reference will now be made to the drawings wherein like numerals refer to like parts throughout. FIG. 1 illustrates a ladder assembly 100 configured in accordance with a preferred embodiment of the present invention in which the assembly 100 is mounted to a pickup truck and adapted to facilitate climbing in an out of the truck bed. It will be readily understood and appreciated, however, that the ladder assembly 100 can be used with pickup trucks of different sizes and classes. The ladder assembly 100 also may be used with a variety of other vehicles, such as flatbed trucks, cargo trucks, sports utility vehicles, or the like.

Before describing the ladder assembly 100 in detail, an exemplary pickup truck 102 first will be described to assist the reader in understanding the ladder assembly 100. As seen in FIG. 1, the pickup truck 102 includes a cab 104 at the front end 106 of the truck 102 and a vehicle bed 108 at the rear end 110. The vehicle bed 108 has a conventional rectangular shape and includes upright sidewalls 112 extending from the cab 104 to the rear end 116 of the truck 102. The truck 102 also includes a tailgate 114 extending between the sidewalls 112 of the truck 102 and pivotably attached to the rear end 116 of the vehicle bed 108 so as to move between an open and closed orientation.

As shown in FIG. 1, the ladder assembly 100 includes a ladder 118 which comprises two support legs or rails 120 with a plurality of step components or rungs 122 securely attached therebetween. Preferably, the support legs or rails 120 are heavy duty and configured to be substantially weather resistant, chemical resistant and support various weights. In one embodiment, the support legs or rails 120 are made of a high strength material such as C-channel fiberglass. Additionally, the step components or rungs 122 preferably are made of a strong material, such as aluminum, and comprise one or more tread features, which provide a non-skid surface for a user during use. In certain embodiments, the ladder 118 may further comprise brace components 124 that are attached between the step components or rungs 122 for improved structural rigidity and durability during use.

Figure 2:
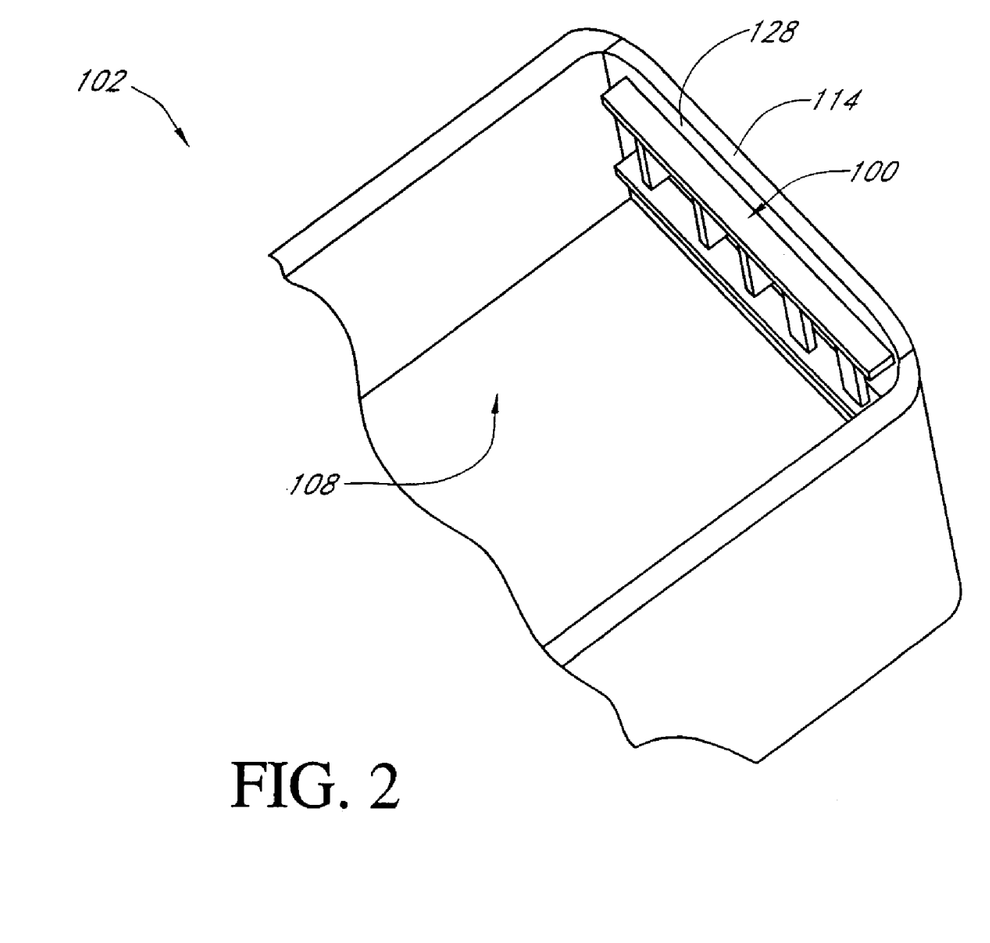
FIG. 2 illustrates the tailgate of the vehicle of FIG. 1 in a closed orientation.

As will be described in greater detail below, the ladder assembly 100 further includes a mounting system 126 for connecting and securing the ladder 118 to a mounting surface 128, such as the interior side of the tailgate 114 of the truck 102. FIG. 1 shows the assembly 100 in a retracted or storage configuration in which the ladder 118 is attached to the interior surface 128 of the tailgate 114 in a substantially parallel manner and extends across the interior surface 128. FIG. 2 provides a partial view of the truck 102 when the tailgate 114 is in a closed or up configuration. As FIG. 2 shows the ladder assembly 100 is positioned within the vehicle bed 108 in a visually obtrusive manner when the tailgate 114 is closed. Moreover, as FIG. 2 also shows, the ladder assembly 100, when secured to the interior surface 128 of the tailgate 114, utilizes a small footprint of storage space and frees up the vehicle bed 108 for other uses.

Figure 3:
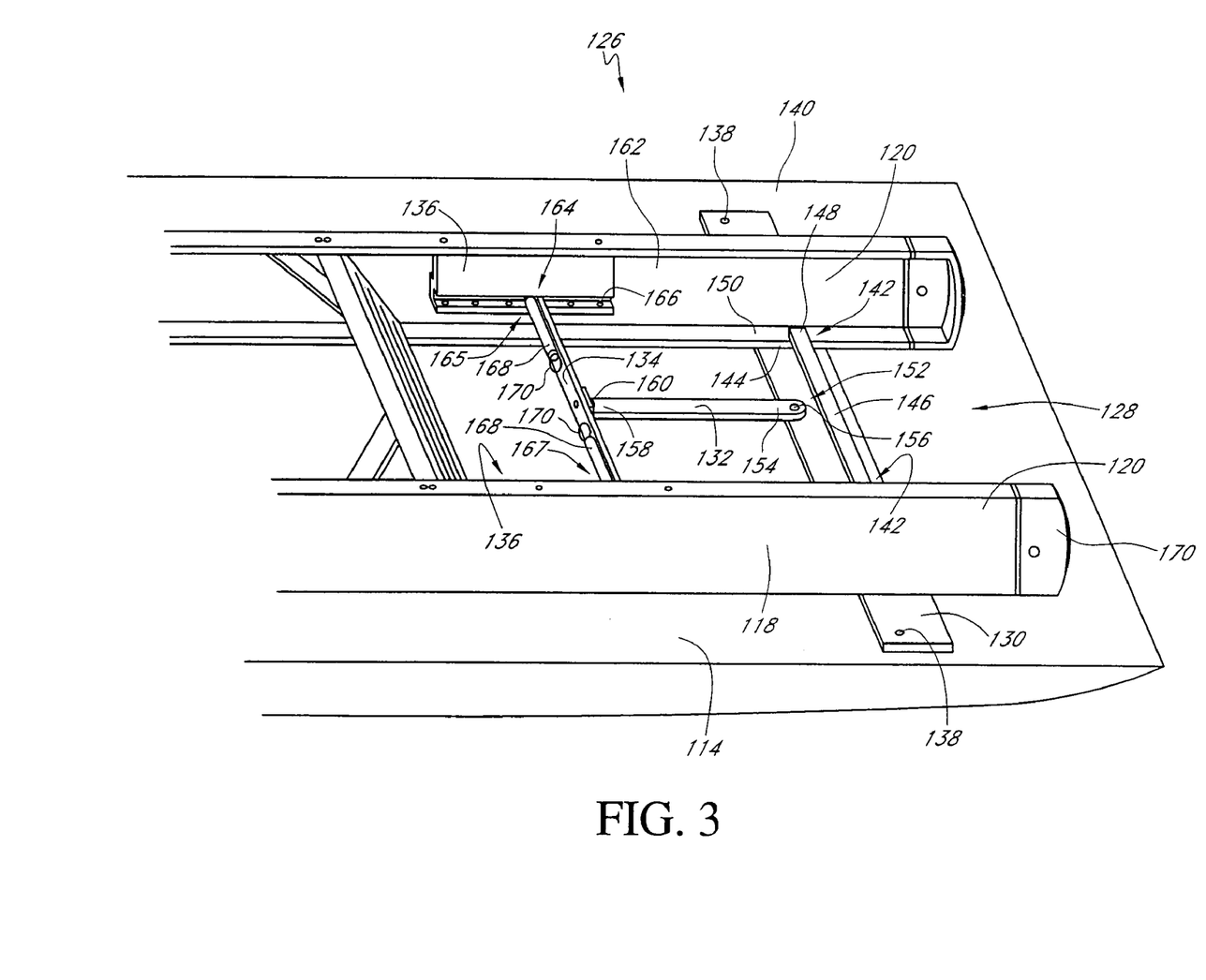
FIG. 3 is a detailed illustration the mounting system of the ladder assembly of FIG. 1.

FIG. 3 is a detailed partial view of the mounting system 126 of one preferred embodiment. As shown in FIG. 3, the mounting system 126 generally includes a mounting bracket 130 for connecting and securing the ladder 118 to the tailgate 114, a pivot armature 132 for rotating the ladder 118 with respect to a horizontal plane, a yoke 134 for rotating the ladder 118 from the horizontal to a vertical orientation, and adjustment guides 136 for adjusting the height of the ladder 118 when it is fully deployed in the upright orientation in a manner to be described in greater detail below.

As shown in FIG. 3, the mounting bracket 130 comprises an elongated plate configured to be mounted on the interior surface 128 of the tailgate 114 with fasteners 138, such as bolts. Preferably, the mounting bracket 130 is positioned adjacent one end 140 of the interior side 128 of the tailgate 114 and extends in a substantially perpendicular direction relative to the length of the tailgate 114. In certain embodiments, the mounting bracket 130 has spaced apart slots 142 formed thereon for receiving and guiding a portion 144 of each support leg or rail 120 of the ladder 118. In one embodiment, the mounting bracket 130 has a raised protrusion 146 that includes a lip 148 at each end thereof that is adapted to couple with a lower portion 150 of a C-channel rail 120 when the ladder 118 is positioned horizontally across the interior surface 128 of the tailgate 114 in a stored configuration as shown in FIG. 3. In another embodiment, the mounting bracket 130 comprises a pair of parallel mounting members that define a recess between the tailgate and the mounting member such that a portion of the ladder can be positioned within the recess so as to suspend the ladder from the mounting members. Advantageously, the mounting bracket 130 provides a guide for positioning and aligning the ladder 118 along the tailgate 114, helps to secure the ladder 118 to the tailgate 114, and provides stability for the ladder 118 during use as will be described in greater detail below.

As FIG. 3 further illustrates, the pivot armature 132 comprises an elongated arm that is rotatably attached to the mounting bracket 130 at a first joint 152 and adapted to rotate in a clockwise and counter-clockwise manner. In one embodiment, a first end 154 of the pivot armature 132 is attached to the mounting bracket 130 by a pivot member 156 such as a bolt that allows rotational movement of the pivot armature in a plane parallel to the inner side of the tailgate. A second end 158 of the pivot armature 132 extends substantially perpendicularly from the plane defined by the interior surface 128 of the tailgate 114 and is attached to the yoke 134 at a second joint 160, which in certain embodiments comprises a bolt that is adapted to pivot.

The yoke 134 generally comprises an elongated rod that is pivotably attached to the second end 158 of the pivot armature 132 at the second joint 160 and extends between and exerts pressure against an inner surface 162 of each rail 120 of the ladder 118. As will be described in greater detail below, the yoke 134 is configured to pivot about the second joint 160 in a manner so as to cause the ladder 118 to rotate with respect to a plane defined by the rails 120 when the ladder is in a substantially upright position.

As also shown in FIG. 3, each adjustment guide 136 comprises a plate having a series of spaced apart apertures 164 formed therein. The adjust guides 136 are configured to be mounted to the inner surface 162 of each rail 120. In one embodiment, opposing ends 164 of the yoke 134 are inserted in the apertures 166 formed in the adjustment guides 136 so as couple the yoke 134 to the adjustment guides 136 at a third and fourth joint 165, 167. Preferably, the yoke 134 extends between the adjustment guides 136 and is removably attached to the adjustment guides 136. As will be described in greater detail below, the support legs 120 of the ladder 118 are pivotable about the yoke 134 at the third and fourth joints 165, 167 so as to permit the ladder to be rotated from a horizontal to the vertical orientation.

In one embodiment, adjustment pins 168 are adapted to couple the yoke 134 to the apertures 164 of the adjustment guide 136. The adjustment guides 136 can be attached to inside portions of the support legs 120 of the ladder 118 with fasteners, such as bolts or rivets. In addition, the adjustment pins 168 can comprise rings 170 that, when actuated with movement away from the support legs 120 and towards each other, that allow the tailgate ladder 118 to be moved to another set of apertures.

Advantageously, the adjustment pins 168 allow the ladder 118 to be vertically adjustable so that the lower portion of the support legs or rails can be adjusted to contact the ground surface during use in a manner as will be described herein below. Also, the ladder 118 may be removed from the yoke 134 by actuating the adjustment pins 168. Moreover, in some embodiments, the ladder 118 further includes top caps 170 comprising a soft material having smooth features, such as for example plastic or rubber, which are adapted to contour the upper portion of the support legs 120 and protect the user from injury during use.

In one embodiment, as further illustrated in FIGS. 1–3, the ladder 118 is attached to the tailgate 114 of the vehicle in a substantially parallel manner. As will be described in greater detail herein below, the ladder 118 pivots about the first joint 152 via the pivot armature 132 so as to extend away from the vehicle bed 108 to a substantially perpendicular position with respect to the tailgate 114. Following, the ladder 118 pivots about the third and fourth joints 166, 167 in a downward manner such that a lower end of the ladder contacts the ground surface. Moreover, the ladder 118 further can pivot about the second joint 160 in a lateral manner such that lower ends of the support legs 120 of the ladder 118 contact the ground depending on the slope of the ground surface. Advantageously, the ladder 118 is adapted to pivot laterally so as to adapt to the slope or incline of the ground surface. Further scope and functionality related to pivoting aspects will be described herein below.

Figure 4A:
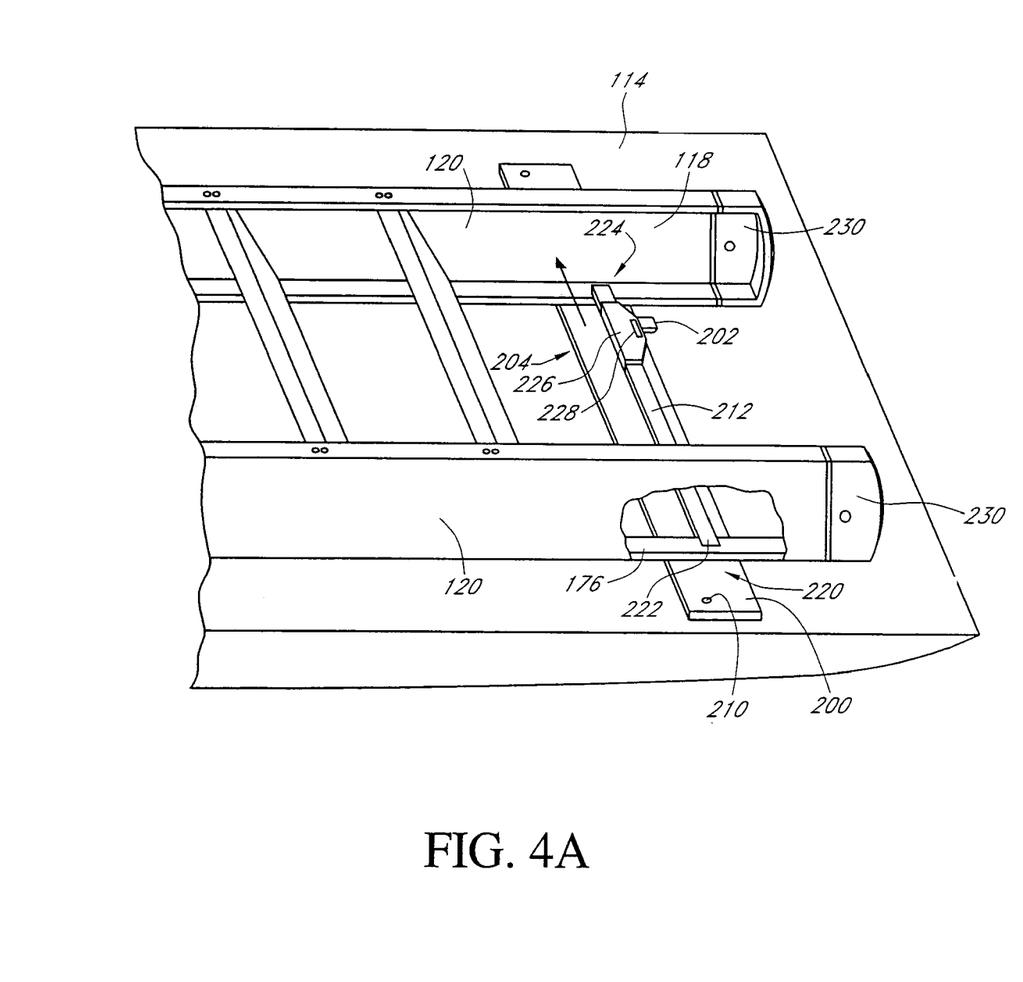
FIGS. 4A–4B is a detailed illustration of the mounting system of the ladder assembly of FIG. 1.
Figure 4B:
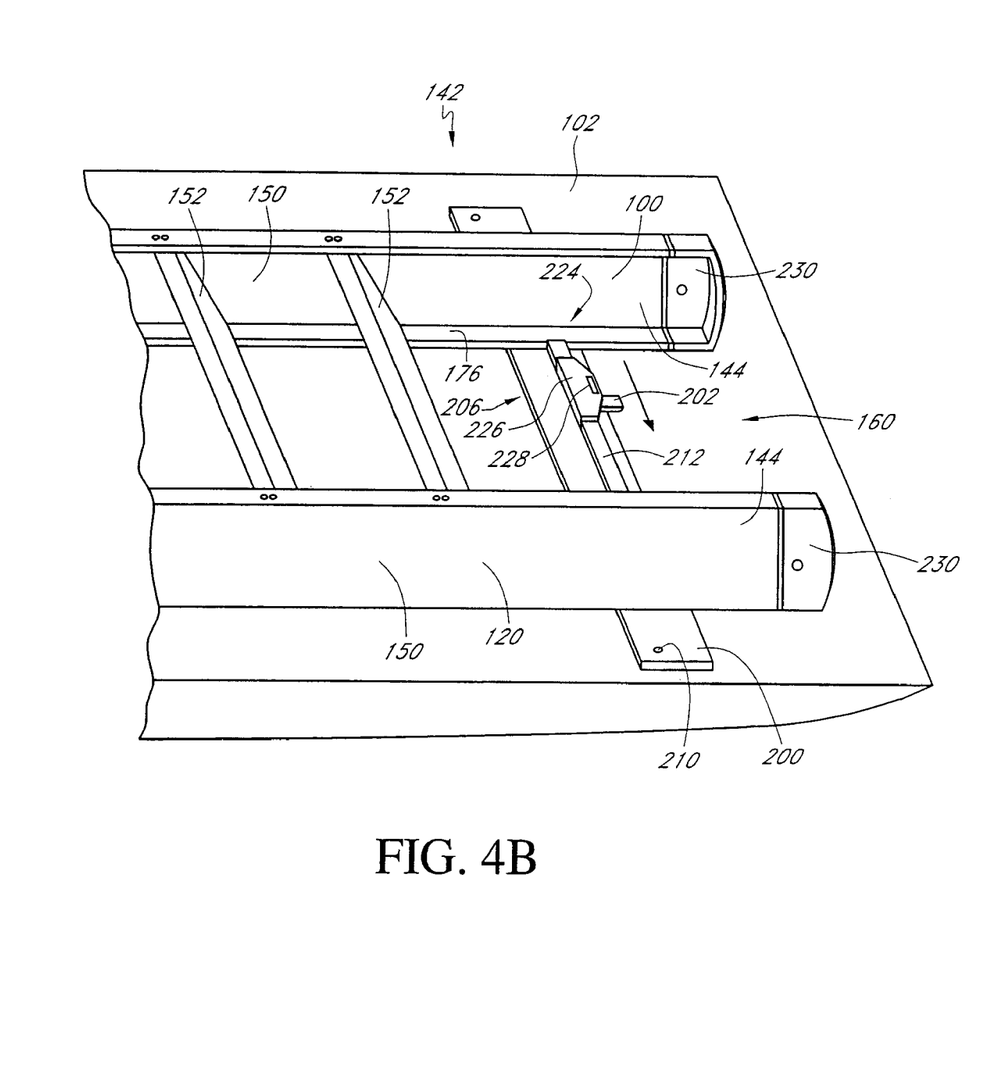

FIGS. 4A–4B illustrate the mounting system 126 as further comprising a second mounting bracket 200 having a locking member 202. In one embodiment, FIG. 4A illustrates the locking member 202 of the second mounting bracket 200 in a closed orientation 204, and FIG. 4B illustrates the locking member 202 in an open orientation 206. The second mounting bracket 200 is securely attached to the tailgate 114 of the vehicle 102 with fasteners 210, such as bolts. The second mounting bracket 200 includes a second raised protrusion 212 that extends between the support legs 120 of the ladder 118. A first end 220 of the second raised protrusion 212 includes a second lip member 222 that couples with the lower portion 176 of at least one of the support legs 120. The locking member 202 is attached to a second end 224 of the raised protrusion 212. The locking member 202 slides along a guide component 226 so as to engage the lower portion 176 of the other support leg 120. In one embodiment, the locking member 202 removably secures at least one of the support legs 150 to the second mounting bracket 200, and the second lip member 222 secures the other support leg 120 to the second mounting bracket 200. Moreover, the locking member 202 further includes a locking aperture 228 that allows a locking device, such as a generally known padlock, to lock the ladder 118 to the tailgate 114 so as to inhibit removal or theft thereof. Additionally, as illustrated in FIGS. 4A–4B, the ladder 118 further comprises a plurality of foot components 230 comprising, for example, a metal material with a rubber pad attached thereto. In one aspect, the rubber pad comprises ridge or tread components that provide a non-skid surface that contacts the ground surface during use.

Figure 5A:
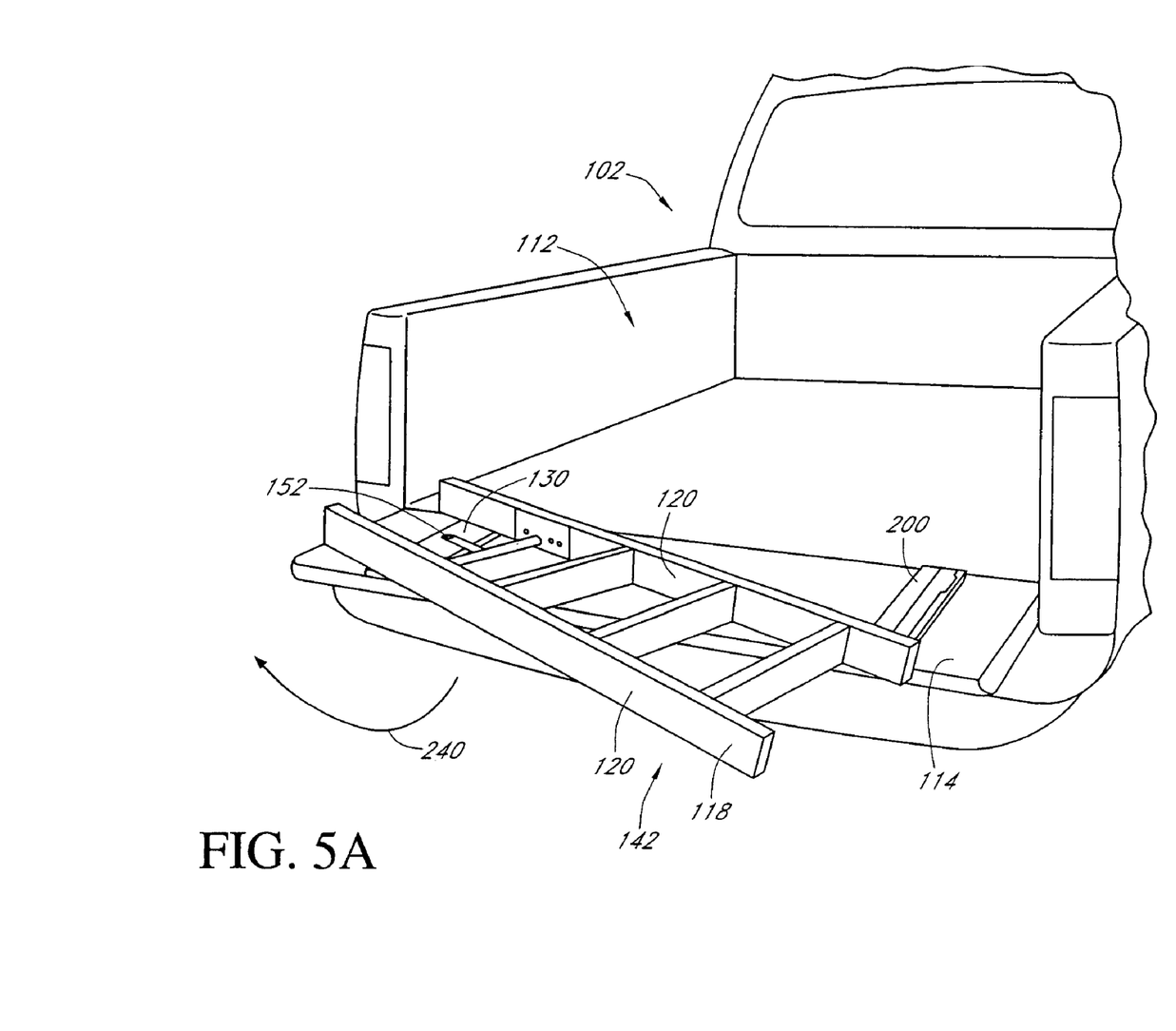
FIGS. 5A–5C illustrate the positional configuration of the ladder of the ladder assembly of FIG. 1.
Figure 5B:
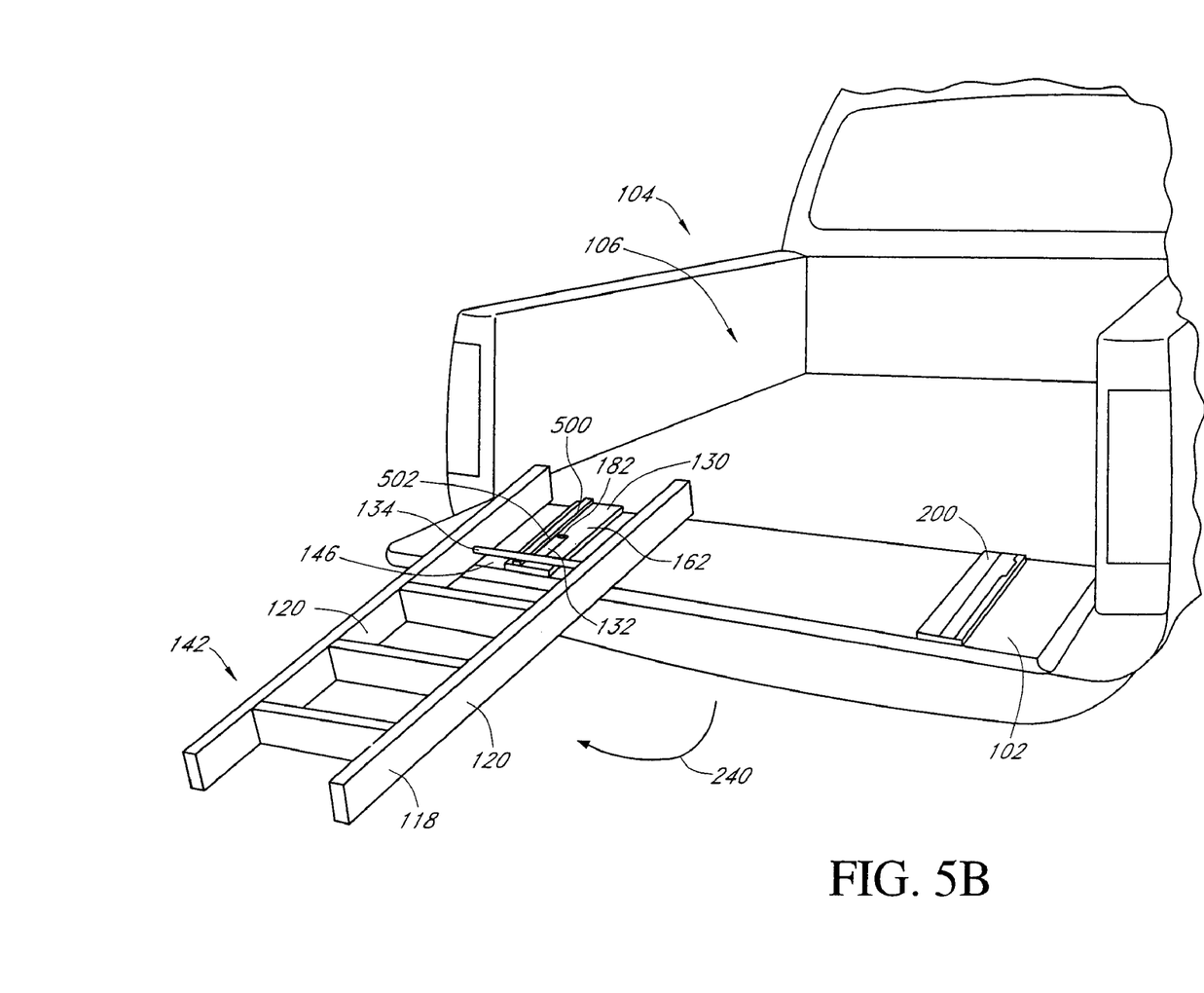
Figure 5C:
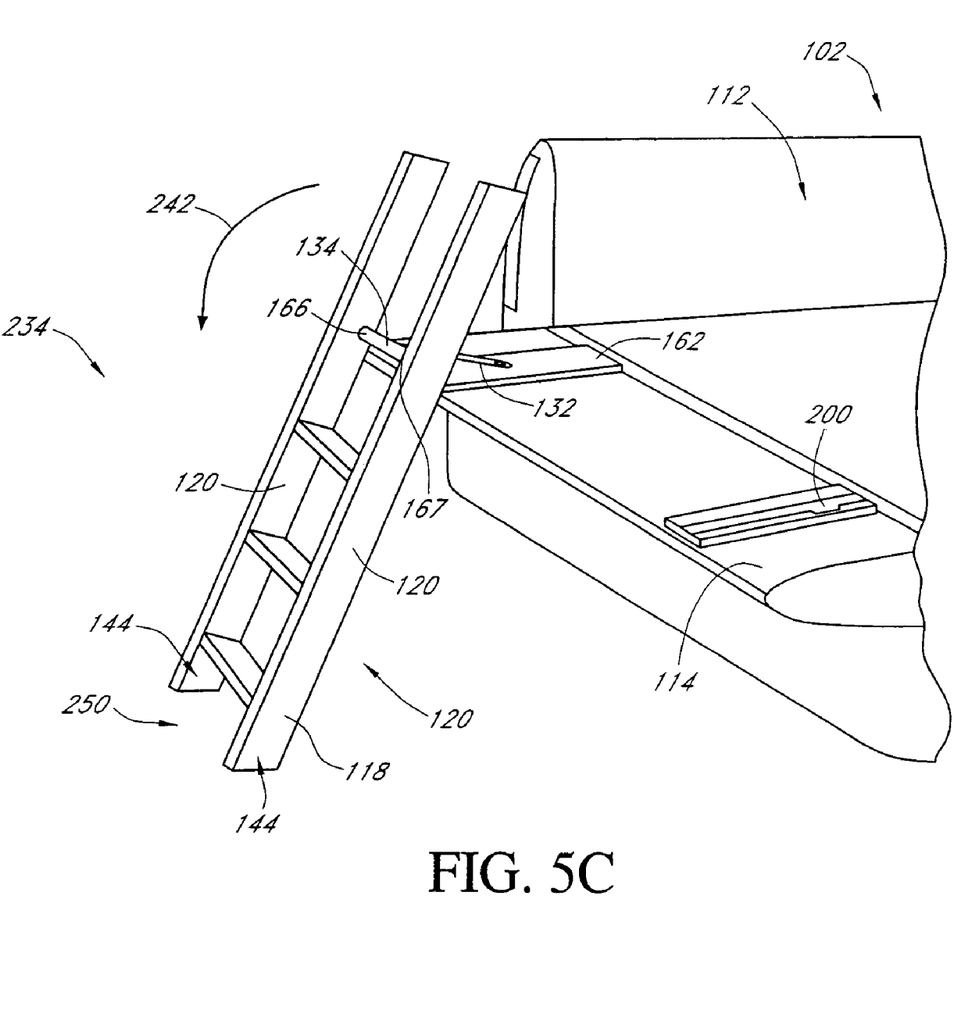

FIGS. 5A–5C illustrate one embodiment of the positional configuration of the tailgate ladder 118. In one embodiment, the tailgate ladder 118 is pivotable from a first positional configuration as shown in FIG. 1 on the tailgate 114 to a second positional configuration 234 as shown in FIG. 5C with the lower portion of the tailgate ladder 118 adjacent to the ground. In one embodiment, during a first movement 240 of the tailgate ladder 118, as illustrated in FIGS. 5A–5B, the lower portion of the ladder 118 is removed from the second mounting bracket 200 such that the ladder 118 pivots about the first joint or pivot 152 so as to be substantially perpendicular to the tailgate 114. In one embodiment, a side edge 500 of the pivot armature 132 is pressed against a side edge 502 of the protrusion 146 on the mounting bracket 130 as shown in FIG. 5B so that further rotational movement in the clockwise direction is stopped when the ladder 118 is rotated to a substantially perpendicular orientation with respect to the tailgate 114, which advantageously helps the user align the ladder properly.

Subsequently, as illustrated in FIG. 5C, the ladder 100 further pivots downwardly in a second movement 242 about the third and fourth joints or pivots 166, 167 so as to be substantially upright or at least partially leaning towards the tailgate 114. Additionally, the lower portion of the ladder 118, including the lower portion 144 of the support legs 118, contacts the ground surface 250, which supports the ladder 118 during use. In addition, the ladder 118 is further supported by the pivot armature 132 and the yoke 134 during use.

Figure 6:
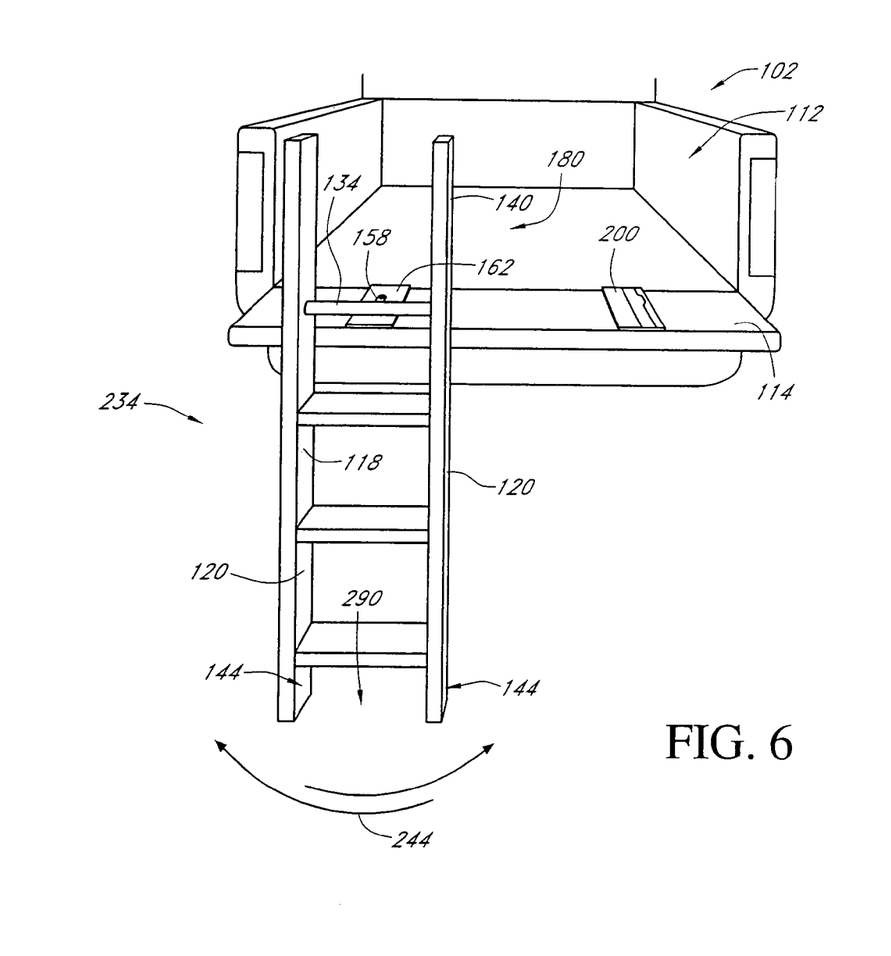
FIG. 6 illustrates a front perspective view of the ladder assembly of FIG. 1 in a deployed configuration.

FIG. 6 illustrates a front perspective view of the ladder 118 in the second positional orientation 234. Advantageously, the ladder 118 pivots about the second joint 158, which connects the yoke and the pivot armature 132, in a lateral manner with a third movement 244 such that the lower ends 144 of the support legs 120 contact the ground 250 in a manner so as to adapt to the slope of the ground surface. Additionally, once the ladder 118 is deployed in the second positional orientation 234, as shown in FIG. 6, the ladder 118 is pivotable sideways or laterally with respect to a plane defined by the rails 120 so as to accommodate uneven surfaces of the ground, such as on an inclined or sloped ground surface. Also, in one aspect, the upper portion 140 of the rails 120 functions as handrails during use when the ladder 118 is in the second positional orientation 234.

Although the above-disclosed embodiments of the present teachings have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present teachings. Consequently, the scope of the invention should not be limited to the foregoing description, but should be defined by the appended claims.

What is claimed is:

1. A ladder assembly for a cargo vehicle having a cargo space wherein articles can be positioned for transport, the ladder assembly comprising:

a mounting structure that is adapted to attach to an interior surface of the cargo space of the vehicle;

a ladder having a pair of side members and a plurality of rungs extending therebetween;

an attachment assembly interconnecting the ladder to the mounting structure, wherein the attachment assembly allows for movement of the ladder from a storage configuration wherein the ladder assembly is secured to the interior surface of the cargo space of the vehicle to a deployed configuration wherein the ladder is rotated out of the plane of the interior surface and pivoted so as to be extended from the interior surface of the cargo space of the vehicle to the ground so as to allow an individual access to the cargo space of the vehicle from the ground by climbing the ladder, wherein the attachment assembly includes a pivot member so as to allow the ladder to pivot in the deployed configuration about an axis to thereby allow the side members of the ladder to be positioned in contact with the ground when the ground is not parallel to the interior surface;

wherein the attachment assembly includes a first pivot structure that has a pivot axis perpendicular to the interior surface of the cargo space so as to allow the ladder to rotate in the plane of the interior surface of the cargo space so as to be positioned outward of the interior surface;

wherein the mounting structure is adapted to engage with the ladder when the ladder is positioned outward of the interior surface so as to limit the rotational movement of the ladder about the first pivot axis; and wherein the attachment assembly includes a third pivot structure that allows the ladder to pivot about a third axis when extending from the interior surface to the ground.

2. The assembly of claim 1, wherein the mounting structure is adapted to be mounted to an inner surface of a tailgate assembly of a pickup truck such that, in the storage configuration, the ladder is secured to the tailgate when the tailgate is in a closed position.

3. The assembly of claim 2, wherein the mounting structure secures the ladder to the tailgate such that the ladder is suspended from the tailgate to thereby remove the ladder from the floor of the bed of the pickup truck to increase the amount of available space within the bed of the pickup for cargo.

4. The assembly of claim 3, wherein the securing structure comprises a pair of parallel mounting members that are adapted to mount to the tailgate and define a recess between the tailgate and the mounting member such that a portion of the ladder can be positioned within the recess so as to suspend the ladder from the mounting members.

5. The assembly of claim 1, wherein the attachment assembly includes a second pivot structure that allows the ladder to pivot so as to allow the ladder to extend from the interior surface of the cargo space to the ground.

6. A ladder assembly for a cargo vehicle having a cargo space wherein articles can be positioned for transport, the ladder assembly comprising:

a mounting structure that is adapted to attach to an interior surface of the cargo space of the vehicle;

a ladder having a pair of side members and a plurality of rungs extending therebetween;

an attachment assembly interconnecting the ladder to the mounting structure, wherein the attachment assembly allows for movement of the ladder from a storage configuration wherein the ladder assembly is secured to the interior surface of the cargo space of the vehicle to a deployed configuration wherein the ladder is rotated out of the plane of the interior surface and pivoted so as to be extended from the interior surface of the cargo space of the vehicle to the ground so as to allow an individual access to the cargo space of the vehicle from the ground by climbing the ladder, wherein the attachment assembly includes a pivot member so as to allow the ladder to pivot in the deployed configuration about an axis to thereby allow the side members of the ladder to be positioned in contact with the ground when the ground is not parallel to the interior surface;

wherein the side members of the ladder assembly are coupled to the attachment assembly in a manner that allows the ladder to be extended outward from the interior surface in the deployed configuration; and wherein the attachment assembly includes a securing member that couples the side members of the ladder to the attachment assembly and a plurality of mounting locations that engage the securing member so as to allow the securing member to be attached to the mounting locations in one of a plurality of different mounting orientations.

7. The assembly of claim 6, wherein the securing member attached to the attachment assembly and the mounting locations comprise a plurality of holes formed in the side members of the ladder such that the ladder can be detachably engaged to the attachment assembly in one of a plurality of different locations and wherein the securing member defines a pivot point for the ladder with respect to the attachment assembly.

8. A ladder assembly for a pickup truck having a tailgate comprising:

a mounting structure that is adapted to attach to the interior surface of the tailgate of the pickup truck;

a ladder having two side members and a plurality of rungs extending therebetween;

an attachment assembly interconnecting the ladder to the mounting structure, wherein the mounting structure retains the ladder in a storage configuration against the tailgate when the tailgate is in the closed position such that the side members of the ladder extend parallel to the length of the tailgate in the storage configuration and wherein the attachment assembly permits the ladder to be rotated out of the plane of the tailgate and then pivoted downward to the ground in a deployed configuration when the tailgate is opened;

wherein the attachment assembly includes a first pivot structure that has an pivot axis perpendicular to the interior surface of the cargo space so as to allow the ladder to rotate in the plane of the interior surface of the cargo space so as to be positioned outward of the interior surface;

wherein the attachment assembly includes a second pivot structure that allows the ladder to pivot so as to allow the ladder to extend from the interior surface of the cargo space to the ground;

wherein the attachment assembly includes a third pivot structure that allows the ladder to pivot about a third axis when extending from the interior surface to the ground.

9. The assembly of claim 8, wherein the mounting structure is adapted to secures the ladder to the tailgate such that the ladder is suspended from the tailgate to thereby remove the ladder from the floor of the bed of the pickup truck to increase the amount of available space within the bed of the pickup for cargo.

10. The assembly of claim 9, wherein the securing structure comprises a pair of parallel mounting members that are adapted to mount to the tailgate and define a recess between the tailgate and the mounting member such that a portion of the ladder can be positioned within the recess so as to suspend the ladder from the mounting members.

11. The assembly of claim 8, wherein the mounting structure engages with the ladder when the ladder is positioned outward of the interior surface so as to limit the rotational movement of the ladder about the first pivot axis.

12. A ladder assembly for a pickup truck having a tailgate comprising:
  a mounting structure that is adapted to attach to the interior surface of the tailgate of the pickup truck;
  a ladder having two side members and a plurality of rungs extending therebetween;
  an attachment assembly interconnecting the ladder to the mounting structure, wherein the mounting structure retains the ladder in a storage configuration against the tailgate when the tailgate is in the closed position such that the side members of the ladder extend parallel to the length of the tailgate in the storage configuration and wherein the attachment assembly permits the ladder to be rotated out of the plane of the tailgate and then pivoted downward to the ground in a deployed configuration when the tailgate is opened;
  wherein the side members of the ladder assembly are coupled to the attachment assembly in a manner that allows the ladder to be extended outward from the interior surface in the deployed configuration;
  wherein the attachment assembly includes a securing member that couples the side members of the ladder to the attachment assembly and a plurality of mounting locations that engage the securing member so as to allow the securing member to be attached to the mounting locations in one of a plurality of different mounting orientations.

13. The assembly of claim 12, wherein the securing member attached to the attachment assemblies and the mounting locations comprise a plurality of holes formed in the side members of the ladder such that the ladder can be detachably engaged to the attachment assembly in one of a plurality of different locations and wherein the securing member defines a pivot point for the ladder with respect to the attachment assembly.

14. A ladder assembly for attachment to a tailgate of a vehicle, comprising:
  a ladder having two side rails and a plurality of steps extending therebetween;
  a mounting structure adapted to couple to the ladder, the mounting structure adapted to being attached to the tailgate and the ladder so as to secure the ladder to the tailgate in a storage configuration such that the ladder extends across an interior surface of the tailgate, the mounting structure further comprising a first pivot that allows the ladder to be deployed in a deployed configuration so as to extend from the tailgate to the ground and a second pivot that allows the ladder to be pivoted sideways when the ladder is in the deployed configuration;
  wherein the mounting structure includes a first pivot structure that has a pivot axis perpendicular to the interior surface of the cargo space so as to allow the ladder to rotate in the plane of the interior surface of the cargo space so as to be positioned outward of the interior surface;
  wherein the mounting structure includes a second pivot structure that allows the ladder to pivot so as to allow the ladder to extend from the interior surface of the cargo space to the ground; and
  wherein the mounting structure includes a third pivot structure that allows the ladder to pivot about a third axis when extending from the interior surface to the ground such that the two side members of the ladder can contact the ground when the ground is not parallel to the tailgate.

15. The assembly of claim 14, wherein the mounting structure is adapted to secures the ladder to the tailgate such that the ladder is suspended from the tailgate to thereby remove the ladder from the floor of the bed of the pickup truck to increase the amount of available space within the bed of the pickup for cargo.

16. The assembly of claim 15, wherein the mounting structure comprises a pair of parallel mounting members that are adapted to mount to the tailgate and define a recess between the tailgate and the mounting member such that a portion of the ladder can be positioned within the recess so as to suspend the ladder from the mounting members.

17. The assembly of claim 16, wherein the mounting structure further comprises a locking member that can be locked so as to secure the ladder in the storage configuration.

18. The assembly of claim 14, wherein the mounting structure engages with the ladder when the ladder is positioned outward of the interior surface so as to limit the rotational movement of the ladder about the first pivot axis.

19. The assembly of claim 14, wherein the side members of the ladder are coupled to the mounting structure in a manner that allows the ladder to be extended outward from the tailgate in the deployed configuration.

20. A ladder assembly for attachment to a tailgate of a vehicle, comprising:
  a ladder having two side rails and a plurality of steps extending therebetween;
  a mounting structure adapted to couple to the ladder, the mounting structure adapted to being attached to the tailgate and the ladder so as to secure the ladder to the tailgate in a storage configuration such that the ladder extends across an interior surface of the tailgate, the mounting structure further comprising a first pivot that allows the ladder to be deployed in a deployed configuration so as to extend from the tailgate to the ground and a second pivot that allows the ladder to be pivoted sideways when the ladder is in the deployed configuration;
  wherein the side members of the ladder are coupled to the mounting structure in a manner that allows the ladder to be extended outward from the tailgate in the deployed configuration;
  wherein the mounting structure includes a securing member that couples the side members of the ladder to the mounting structure and a plurality of mounting locations that engage the securing member so as to allow the securing member to be attached to the mounting locations in one of a plurality of different mounting orientations.

21. The assembly of claim 20, wherein the securing member is attached to the mounting structure and the mounting locations comprise a plurality of holes formed in the side members of the ladder such that the ladder can be detachably engaged to the mounting structure in one of a plurality of different locations and wherein the securing member defines a pivot point for the ladder with respect to the mounting structure.

22. A ladder assembly for attachment to a tailgate of a vehicle, comprising:
- a ladder having at least two support legs and a plurality of step components extending therebetween;
- a mounting bracket that is adapted to attach to a mounting surface on the tailgate of the vehicle and secured to said ladder thereto;
- a pivot armature having a first end and a second end, said first end is connected to the mounting bracket at a first pivot such that the armature is rotatable about the first pivot with respect to a plane parallel to the mounting surface; and
- a yoke connected to the second end of the pivot armature at a second pivot such that the yoke is rotatable about the second pivot in a plane substantially perpendicular to the mounting surface, wherein the opposing ends of the yoke are each connected to a respective support leg of the ladder at a third and fourth pivot such that the support legs are rotatable about the third and fourth pivots with respect to a plane substantially perpendicular to the mounting surface.

* * * * *